Oct. 23, 1962   F. McGUIRK   3,059,737
MEANS FOR ADJUSTABLY CONNECTING TOGETHER TWO PARTS
Filed April 27, 1961

3,059,737
MEANS FOR ADJUSTABLY CONNECTING TOGETHER TWO PARTS

Francis McGuirk, Birmingham, England, assignor to Chamberlain & Hookham Limited, Birmingham, England
Filed Apr. 27, 1961, Ser. No. 106,102
Claims priority, application Great Britain May 2, 1960
2 Claims. (Cl. 189—36)

This invention relates to means for adjustably connecting together two superposed parts where it is desired to arrange the two parts in either of two alternative relative positions and the object of the invention is to provide a new or improved arrangement in which adjustment can be effected in a simple and effective manner.

Means for adjustably connecting together two superposed parts according to the present invention comprise a slotted lug provided on one of said parts and a washer having an aperture which is of smaller area than the slot formed in the lug, said washer having spaced projections which are engageable with said lug so as to locate the washer and the lug in either of two relative positions and the aperture in the washer being non-centrally disposed between said projections, there being also provided an aperture in the other of said parts and the arrangement being such that a screw or other fastening element can extend through the washer aperture, the slot in the lug and the aperture in said other part so as to connect the two parts together when said washer aperture and the other aperture are in register with each other.

Conveniently, the said projections are formed respectively by a pair of bent tabs on the washer.

The two parts may further be connected together or adapted to be connected together at another position by non-adjustable means so that adjustment of the relative positions of the two parts as above described will result in one of said parts pivoting with respect to the other part about said other position. Alternatively, the two parts may also be connected at said other position by adjustable means in accordance with the present invention so that, in this arrangement, both connections can be adjusted to provide bodily movement of one part relative to the other.

Figure 1:
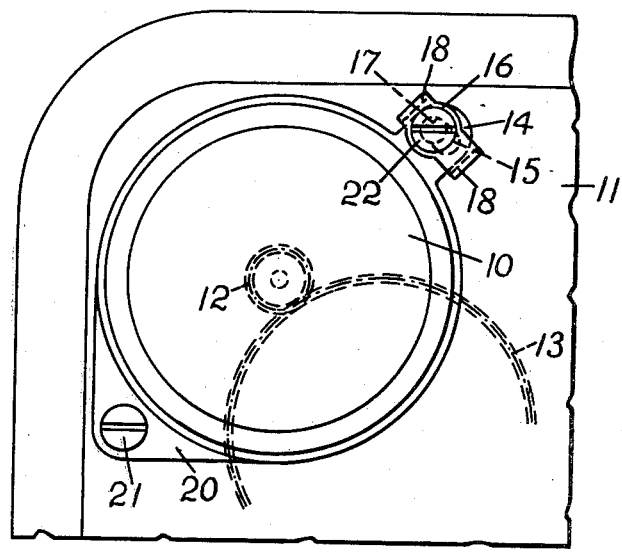
Figure 2:
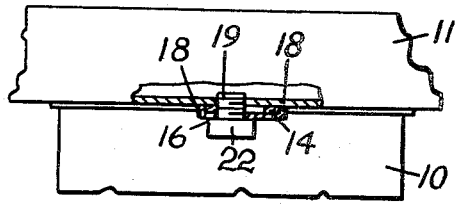

The invention will now be more particularly described with reference to the accompanying drawings wherein, FIGURES 1 and 2 are respectively a fragmentary plan and a fragmentary side elevation showing one example of means in accordance with the invention.

Referring to the example shown in the drawings there is provided an electric motor 10 of the synchronous type which it is required to mount on a base or housing 11 in either of two alternative positions. It is, however, to be understood that the invention can be applied to the connecting of two superposed parts other than an electric motor and a base or housing.

In the present example the synchronous motor 10 is used to drive a train of gears and it is required that said gears should be rotated at a constant predetermined speed. The speed of rotation of the motor depends on the frequency of the supply current so that the motor speed will increase with increase of frequency. The motor spindle or shaft projects from one end of the motor and on said spindle or shaft is mounted a gear 12 which engages with the gear train 13 that is to be driven. Consequently, if the speed of the final gear of the gear train is to remain constant (assuming the overall ratio of the train to be unaltered), the driving gear 12 mounted on the motor spindle or shaft will have to be changed when the frequency of the supply current is changed. Thus if the frequency of the supply current can have two alternative values it will be necessary to provide two sizes of gear 12 for mounting on the motor spindle or shaft, and if the gear train mounted in the housing is to remain undisturbed it will be necessary to shift the motor relative to the housing in order to accommodate the two sizes of motor gear.

Accordingly, the motor is provided with a projecting lug 14 which is formed with an elongated slot 15 and there is also provided a washer 16 having a central part formed with a circular aperture 17. Said washer is also provided with a pair of oppositely disposed tabs 18, each tab being bent in a direction at right angles to the plane of the washer so as to form a pair of spaced projections between which is arranged the washer aperture 17 in an asymmetrical disposition.

The housing is provided with a screwed aperture 19 which corresponds in size with the aperture of the washer and the distance between the two projections formed on the washer is equal or substantially equal to the width of the lug 14 provided on the motor assembly. The motor assembly is also provided with a further lug 20 having an aperture through which can extend a screw 21 so that the motor can be connected to the housing at a second position.

With the aforementioned washer 16 arranged so that the projections 18 formed thereon engage with the lug 14 of the motor a screw 22 can be passed through the aperture 17 in the washer and thence into the screwed aperture 19 formed in the housing when said two apertures 17 and 19 have been aligned with each other.

When it is desired to adjust the motor relative to the housing the washer 16 is turned through 180° so that the position of the motor will have to be adjusted in order to bring the aperture 17 in the washer and the aperture 19 in the housing into register with each other again. Thus adjustment and location of the motor relative to the housing in two alternative positions can be easily and readily effected.

Having thus described my invention what I claim as new and desire to secure by Letters Patent is:

1. Means for adjustably connecting together two superposed parts, said means comprising a slotted lug provided on one of said parts and a washer having an aperture which is of smaller area than the slot formed in the lug, said washer having spaced projections which are engageable with said lug so as to locate the washer and the lug in either of two relative positions and the aperture in the washer being non-centrally disposed between said projections, there being also provided an aperture in the other of said parts and the arrangement being such that a screw or other fastening element can extend through the washer aperture, the slot in the lug and the aperture in said other part so as to connect the two parts together when said washer aperture and the other aperture are in register with each other.

2. Means according to claim 1 wherein the said projections are formed respectively by a pair of bent tabs on said washer.

No references cited.